United States Patent Office 3,408,316
Patented Oct. 29, 1968

3,408,316
PREFORMED THERMAL INSULATION MATERIAL
AND BINDER FOR MOLDING SAME
Arthur P. Mueller and Beverly Asher, Cincinnati, Ohio, assignors, by mesne assignments, to Phillip Carey Corporation, a corporation of Ohio
No Drawing. Continuation-in-part of application Ser. No. 344,563, Feb. 13, 1964. This application Feb. 9, 1966, Ser. No. 526,052
16 Claims. (Cl. 260—17.2)

ABSTRACT OF THE DISCLOSURE (a) A binder composition for use in pressure molded mass of finely divided cellular and fibrous siliceous mineral and inorganic thermal insulating material consisting of a mutually compatible colloidal solution in water of a high swelling bentonite clay-water-dispersible low-and-stable viscosity modified starch-phenol-formaldehyde thermosetting resin binder and (b) molded thermal insulation for service in the "dual temperature" range consisting of said binder, cellular expanded perlite, asbestos fiber and glass fibers.

---

This invention relates to a molded thermal insulation material composed predominantly of a mixture of inorganic mineral materials of cellular, finely divided, and fibrous character, bonded together and preformed by pressure molding into units of a size and shape suitable for application on the surfaces to be insulated. This application is a continuation-in-part of copending application, Ser. No. 344,563, filed February 13, 1964 and now abandoned. More particularly, the product of this invention is especially suitable for use in what is commonly termed the "dual temperature" range. The insulation may be in the form of pipe covering, flat or curved blocks, or large sheets or slabs.

By the term "dual temperature" is meant that the insulation is suitable effectively to insulate surfaces both in the low temperature range, such as ice water or brine, from about 0° F. to about 60° F., and in the moderate heat range, such as hot water and low-temperature steam, from about 150° to about 350° F. Thus, the product of this invention may be used in the form of hemi-cylindrical covering on pipes or tubing carrying chilled water or brine and may also be used to insulate hot water and low-pressure steam piping or tanks in industrial plants, commercial building, institutions and apartment buildings. It may also, of course, be used to insulate pipes or vessels in the temperature range between 60° and 150° F., if desired.

When a porous insulation is used on surfaces with a temperature below 30° F., as on brine piping, it is necessary to encase the insulation with a moisture-impervious vapor barrier to prevent condensation and freezing of moisture within the insulation material. With an effective vapor barrier the temperature range of usefulness of this new insulation can be extended downward to about −50° F. or even lower. Also, at the upper end of the temperature range, the product of this invention may be used at temperatures of 400° F. and higher, above the usual "dual temperature" service range. When applied on heated surfaces at temperatures from 400° F. up to about 800° F. the new insulation shows moderate loss of strength due to the destruction of the organic components of the binder, particularly of the inner layer adjacent the heated surface, but no disintegration or general structural failure; and it remains serviceable and effective for its purpose.

Insulations now available for use in the "dual temperature" ranges have very serious deficiencies. Particularly, the commonly used pipe covering made from resin-bonded glass fibers has very low resistance to crushing and other mechanical damage after it has been installed, and its resistance to water absorption is quite low.

Broadly, the purpose of this invention is to provide a molded thermal insulation for service in the "dual temperature" range that is hard, strong and crush-resistant; has high thermal insulation efficiency and low density; that is resistant to moisture absorption from the atmosphere and to deterioration by water, even at steam temperatures; and that can be produced at low cost.

Another object of this invention is to provide a molded thermal insulation that is predominantly inorganic and mineral in composition, and that contains so little organic material in its composition that it is not subject to deterioration by bacteria or fungi when used in the low temperature portion of the dual temperature range, even where excessive moisture is present that would favor microbial life.

It is another object of the present invention to produce this new insulation by a direct molding operation involving pressure compaction of a loose mixture of the cellular, finely-divided and fibrous mineral ingredients of the composition, that has previously been moistened with a water-dispersed binder composition, without expulsion of water from the mold, followed by drying of the molded piece. It is an advantageous feature of the invention that when the new insulation is thus produced, the shrinkage and warpage of the product during drying are negligible, and the finished dried product has substantially the shape and dimensions of the mold cavity in which it was formed. Thus, no machining to finished dimensions is required and the molded insulation provides an exact fit for the piping or other surface to which it is applied.

It is a particularly advantageous feature of the present invention that the binder composition which is used to bond the cellular, finely-divided, and fibrous mineral materials into a monolithic molded piece of insulation, is a water-dispersed mixture of a montmorillonitic clay, a low- and stable-viscosity modified starch, and a heat-reactive phenolic-type formaldehyde resin. Thus, the binder is a combination of an inorganic mineral binder with two different organic binder materials, one of which, namely, the modified starch, is a flexible, tough, non-hardening film former and the other, namely, the phenolic-type resin, is a thermosetting binder. All three of these binder materials are completely water-dispersible and are compatible within the ranges of proportions which are herein disclosed, and when thus commingled become, in effect, a single binder having the special properties and advantages hereinafter set forth.

The major ingredient of this new molded thermal insulation is finely-divided, cellular, expanded perlite of selected bulk density and sieve analysis (screen size grading). In addition to the binder mixture, minor ingredients are relatively long glass fibers (chopped, spun roving) for structural reinforcement, a very short asbestos fiber to improve toughness and reduce thermal conductivity, and a small amount of silicone to enhance the water repellency of the molded product.

Expanded perlite has previously been used in the manufacture of certain preformed thermal insulations, including wall boards, roof insulation boards, roof deck slabs, and industrial heat insulations. In particular, reference is made to U.S. Patent No. 2,884,380, issued April 28, 1959 to Cook, Fleming and Heilman. This patent disclosed the manufacture of a general-purpose industrial insulation for the temperature range from −350° up to 1700° F. and having cellular expanded perlite as the major ingredient of its composition. An optional ingredient for mechanical reinforcement of the molded product was up to 15% by weight of animal, vegetable or mineral fiber. The binder used was a combination of montmorillonitic clay, such as bentonite, with an organic binder, including such materials as polyvinyl acetate, emulsified asphalt, acrylic polymers, carboxymethyl cellulose, vinyl polymers, and starch. The only starch disclosed in the above patent was an ordinary untreated cornstarch.

In relation to the above cited U.S. patent, the present invention is to be regarded as a further advancement in molded thermal insulation employing cellular expanded perlite in combination with other finely-divided, stable and heat resistant mineral and fibrous inorganic materials, this mineral mixture being bonded into monolithic form of precise shape and dimensions by a water-dispersed composite mineral-organic binder. The details of composition and manufacture and the advantages afforded by this invention are set forth hereinbelow. The present invention produces a perlite insulation product that is superior in important respects to what can be made by following the teachings of the Cook et al. patent and overcomes serious manufacturing difficulties that are inherent in that patent.

The principal raw material for the manufacture of the new thermal insulation is perlite ore, a naturally occurring siliceous, vitreous mineral, generally believed to be of volcanic origin and containing a small amount of entrapped moisture. Large deposits of raw perlite ore are found in many countries of the world. In the United States there are deposits of suitable quality for the purpose in Colorado, Arizona, New Mexico, Nevada and other western states. For economy in transportation cost the dense raw ore is usually shipped to the plant location where the expanded perlite is to be used and the expansion process is carried out at the point of manufacture.

Before the raw perlite is subjected to the expanding process, it is first ground to nominal 100 mesh size. A typical specification for the sieve analysis of suitably pulverized perlite ore to be used in making the new insulation is as follows:

| A.S.T.M. Standard Sieve No. | Accumulative Percent Retained by Weight | |
|---|---|---|
| | Min. | Max. |
| 50 | | 6 |
| 100 | 55 | 75 |
| 200 | 95 | 100 |

The expanding process consists of subjecting the pulverized perlite ore to heat of about 1600° to 2000° F. under controlled conditions in an expanding furnace. Under this heat processing the minute perlite ore particles expand or "pop" into cellular, rigid, glassy, generally spherical individual particles of extremely low bulk density and high thermal insulation capability. This invention is directed to converting this loose unbonded mass of fragile, minute, cellular, glassy spheres into a rigid strong, monolithic molded insulation.

For the manufacture of the new thermal insulation, an expanded cellular perlite of very low bulk (loose fill) density, in the range of 1.8 to 3.5 pounds per cubic foot is used. The best combination of properties of the finished molded product is obtained when the bulk density of the expanded perlite is in the range of 2.3 to 2.8 pounds per cubic foot. The bulk density can be maintained within this preferred range by controlling the sieve analysis of the ore and the temperature and rate of heating in the expansion process.

Expanded perlite within the limits of the following specifications for sieve analysis gives particularly good results in the manufacture of the new insulation.

| A.S.T.M. Standard Sieve No. | Percent Retained by Volume | |
|---|---|---|
| | Min. | Max. |
| 20 | 3 | 10 |
| 30 | 15 | 30 |
| 50 | 45 | 60 |
| 100 | 2 | 5 |
| Passing No. 100 Sieve | 5 | 15 |

Thus, it will be seen that from 60% to 90% by volume of the expanded perlite passes the No. 20 test sieve and is retained on the No. 50 test sieve.

The composite binder which is used to bond together the cellular expanded perlite particles and other finely-divided and fibrous mineral components of the new molded insulation is a water dispersion or colloidal solution of the binder materials. This binder dispersion is separately prepared instead of merely mixing the binder ingredients with the mineral insulation materials.

A typical composition for the binder solution which is suitable for the purpose is the following:

| | Pounds | Percent by Weight |
|---|---|---|
| Bentonite Clay, High Swelling | 1,300 | 51.0 |
| Low- and Stable-Viscosity Modified Starch (Acetylated Corn Starch) | 960 | 37.7 |
| Phenol-Formaldehyde Thermosetting Resin | 288 | 11.3 |
| Water-Soluble Silicone (Sodium Methyl Siliconate) | 58 | |
| Total Solids | 2,606 | 100.0 |
| Water | 20,354 | |
| Batch Total | 22,960 | |

The above formula produces about 2800 gallons of binder solution containing about 0.91 pound per gallon of combined binder solids, or about 11.1% by weight. The binder solution weighs about 8.2 pounds per gallon. Surprisingly, although the binder solution contains about 11.1% by weight of dissolved and dispersed binder solids, its specific gravity is slightly less than that of water, which is attributable to the swelling and expansion of the bentonite clay and the hydration and swelling of the modified starch in the water of the composition. The binder solution is of free flowing consistency and may readily be sprayed, using a standard fine spray nozzle with moderate air pressure.

The silicone is included in the binder solution although it does not itself function as a binder. By thus including the silicone there is obtained the most effective and complete distribution of this material throughout the molded mass and the maximum of water repellency, not only on the outer surface but also on the surfaces of the finely-divided cellular and fibrous particles and binder materials in the interior of the molded insulation, is achieved. The silicone can be omitted without impairing the effectiveness of the binder solution in bonding together the cellular, finely-divided and fibrous minerals. Generally, water-repellency is a desirable though not an essential property of industrial insulation products. The product of this invention can be made without any silicone for use where service conditions do not require water repellency.

All of the ingredients of the composite binder solution are water-dispersible or colloidally soluble. The bentonite clay is a montmorillonitic clay mineral, and the high-swelling type which forms a highly expanded gelatinous suspension in water is used. Suitable bentonite is commercially available from deposits in Wyoming and other states. The phenolic resin also is water-dispersible and is a potentially reactive, or partially reacted, phenol-formaldehyde resin of the thermosetting type which undergoes the characteristic hardening reaction when it is dried at elevated temperatures. Phenolic-type resins are available in numerous modifications, including various phenolic compounds and aldehydes, variations in the degree of resin reaction, catalyst used, etc. For the present purpose a phenolic-type resin is selected which is water-dispersible, stable in a mixture of expanded perlite, asbestos fiber, glass fiber and bentonite clay, and thermo-hardening when dried at a temperature of about 250° F.

The starch component of this binder solution is defined as a low- and stable-viscosity modified starch. Ordinary starch made from corn, potatoes, or tapioca cannot be used in making the product of this invention, for the reason that in water dispersions of the requisite solids content to be properly effective as a binder for the perlite particles, such starches have too high viscosity and are not stable during storage periods but increase in viscosity, often to such a degree as to form a thick gel. Thus the distribution and spreading power of the starch-containing binder are seriously impaired and the binder becomes very difficult or even impossible to apply by spraying. As a consequence, the binder solution is not completely distributed over all surfaces of the expanded perlite particles and fibers of the mixture before molding, so that the resulting molded insulation is low in strength and poor in water resistance.

For the purposes of this invention a starch binder is required which is characterized by low viscosity in water dispersion and the viscosity of which is relatively stable during storage periods, showing little or no thickening or retrogradation. Suitable starch binders are those known as "modified" starches, which have been chemically modified or "converted" by acid, heat, enzyme or oxidation treatment, and which give water dispersions of lower viscosity and improved stability, compared with the untreated parent starch. The oxidized (so-called chlorinated) starches particularly have improved stability of viscosity during storage and are resistant to retrogradation and thickening. Thus, oxidized starch can be used in this binder solution to obtain satisfactory properties in the new molded perlite thermal insulation. other modified starches which have low viscosity in water dispersion and which remain stable in viscosity during storage also can be used.

The preferred kind of modified starch for use in the binder composition of this invention is a partially esterified acetylated corn starch ester which is commonly known in the industry as "acetylated starch." This modified starch has the requisite low-viscosity in the binder solution, exceptional stability of viscosity during storage, and when dried the resultant film is strong, tough and flexible. A commercial variety of acetylated corn starch, produced by National Starch & Chemical Corporation under the brand name "Kofilm," has been found to give very satisfactory results in the binder solution.

The "Kofilm" brand of acetylated starch is modified starch produced by directly linking acetyl groups to starch molecules. The extent of esterificaiton is quite limited, generally in the range of about 2% to 5% of derivatized hydroxyl groups per glucose unit of the starch. The acetylation reduces the viscosity of the water-dispersed starch, compared with the untreated parent starch, and the viscosity is extremely stable. Other properties of the parent corn starch are also improved, such as hydrating ability, tensile strength, temperature stability and resistance to mechanical breakdown of the dispersed starch paste.

Modified starches are well known and various modified starches suitable for use in the binder composition of the invention are produced commercially by several starch manufacturers. The book "Chemistry and Industry of Starch," second edition (1950), by Ralph W. Kerr (Academic Press, New York, N.Y.), in the chapter on "Manufacture of Modified Corn Starches," describes numerous treatments and processes to modify such properties of starch as strength, color, mobility, viscosity and swelling in water.

Quoting from the above chapter:

"Within recent years there has been a growing interest in modifying the paste properties of starch by a very limited amount of chemical derivatization. These are in reality partial derivatives such as esters and ethers. However, the degree of substitution is so low—much less than an average of one derivatized hydroxyl group per glucose residue—that the products behave in many respects like native starches, particularly in that the granules are insoluble and gelatinize when heated in water to form a paste. The pastes of some of these products differ materially from that of the parent starch."

Quoting further:

"Considering that in many cases these starch products do not show on analysis more than one substituted group for each twenty or more glucose units in starch, it seems rather remarkable that the colloidal characteristics of the modified starch should have changed fundamentally. It would appear that a very small number of substitutions on a starch chain, particularly of the linear amylose molecules, are sufficient to prevent the orientation of these molecules to the extent required for associative bonds to form as they do in retrogradation, set back in pastes and the formation of gels."

From the above discussion and quotations regarding chemical modification of starches it is apparent that the partially esterified acetylated corn starch ester of the "Kofilm" type is particularly well adapted to provide the low- and stable-viscosity starch paste requisite for the composite binder of this invention and thus is the preferred type of modified starch.

In the claims, the phrase "water-dispersible, low- and stable-viscosity, modified starch" will be understood to refer to modified or converted starch, the modification (whether by esterification, acetylation, or other reaction) being on the order of 5% or less, to produce water dispersibility, and a low- and stable-viscosity.

One of the most important advantages of this composite binder solution is that the water-dispersed combination of bentonite clay, modified starch and phenolic resin largely prevents the migration of the resin to the outer surface of the molded insulation during the drying operation, thus making the resin more effective in hardening the molded mass throughout its thickness, instead of merely giving it a hard outer crust. While the cause of this desirable effect is uncertain, it is believed that it may be due to absorption of the resin on the surfaces of the bentonite clay and starch particles. It has also been found that the phenol formaldehyde resin, when incorporated with the disperson of the starch derivative, tends to further reduce and stabilize the viscosity of the starch in the binder solution.

The preparation of the new binder solution is quite simple. The modified starch is added to water, agitated and cooked, to swell and disperse the starch granules, at about 195° F. for about 20 minutes. More water is added, and then the phenol formaldehyde resin is added, with additional agitation. A further addition of water is made, followed by addition of the bentonite clay, with an additional period of agitation. The silicone is added, diluted with water, and the batch agitated again. Finally, water is added to make the total specified volume of the batch, and agitation is continued until the binder solution is smooth and free of lumps of undispersed solids. The binder solution is then ready for immediate use or may be stored until needed. If desired, the binder solution may be packaged in closed containers, shipped and sold as a liquid binder in the same way as liquid glue.

While the new composite binder solution is particularly adapted to the manufacture of molded thermal insulation having cellular expanded perlite as the major ingredient of the composition, its usefulness is not thus limited. It also may be used very effectively as a binder for other finely-divided mineral and fibrous materials, such as diatomite, calcium carbonate, magnesium silicate, calcium silicate, asbestos and glass fibers, to produce molded thermal insulations which may contain only a minor proportion of cellular expanded perlite. Such insulations would, of course, be of somewhat higher density and of less efficiency in terms of thermal conductivity than the molded perlite insulation of the present invention.

As to the relative proportions by weight of bentonite clay, modified starch, and phenolic resin in the binder solution, in terms of dry solids content, considerable variation is permissible. Desirably the bentonite clay will be at least half of the total because of its stable mineral nature, heat resistance and low cost. The phenolic resin is effective in relatively small amounts and is the most expensive material in the binder composition. The following tabulation sets forth the binder composition, on a dry solids weight percent basis, both in the preferred range, and in a broader range in which useful results can be obtained.

|  | Binder Composition, Dry Solids Basis, Weight Percent | | | |
|---|---|---|---|---|
|  | Preferred Range | | Broad Range | |
|  | Min. | Max. | Min. | Max. |
| Bentonite Clay | 50 | 65 | 25 | 80 |
| Modified Starch (Low- and Stable-Viscosity) | 25 | 40 | 15 | 55 |
| Phenolic Resin | 8 | 15 | 5 | 20 |

It is of course to be understood that, within the above percent ranges, if one ingredient is at the minimum or maximum of the range, then the percentages of the other ingredients must be adjusted accordingly to total 100 percent.

As a typical example of the practice of the invention, there has been produced a molded thermal insulation of the following composition:

|  | Percent solids, dry weight basis |
|---|---|
| Expanded Perlite | 63.10 |
| Bentonite Clay | 8.65 |
| Modified Starch (Partially Esterified (Acetylated) Corn Starch Ester) | 6.32 |
| Asbestos Fiber, 7W Grade | 18.90 |
| Glass Fiber, 1" Spun Roving | 0.75 |
| Phenolic Resin | 1.89 |
| Water Soluble Silicone (Sodium Methyl Siliconate) | 0.39 |
|  | 100.00 |

In the manufacturing process the 7W asbestos fiber and the glass fiber were weighed and then blended with the specified quantity of expanded perlite. After thorough blending of all the dry ingredients, the dry mixture was sprayed with a measured quantity of the binder solution, containing the specified amounts of bentonite, modified starch, phenolic resin, and silicone. The moistened mixture of mineral materials and binder was then further agitated and blended to complete the distribution of the binder solution over the surfaces of all the mineral particles and fibers. The completed mixture was a bulky, loose, granular mass that appeared to be slightly damp, but not visibly wet.

A weighed quantity of the slightly damp mixture was placed in a mold cavity and subjected to light molding pressure, sufficient to compact the loose material into a monolithic molded mass having the exact configuration of the mold cavity but without expelling any water from the mold. The molded piece was then removed from the mold, subjected to drying in an oven at a temperature of about 250° F., and tested. The dried molded product was a monolithic, hard, strong piece of thermal insulation, of low density and high insulation efficiency, and having the exact dimensions of the mold in which it was formed so that it required no machining or further treatment before use.

In making the molded insulation, the water content of the molded piece (to be removed by drying) usually is about 1.2 to 1.4 times the weight of the dry solids. With varying compositions, however, the water ratio may vary from 1.0 to 1.6 times the weight of dry solids.

When the insulation product of the above typical example was tested it exhibited the following properties:

| | |
|---|---|
| Density, lb. per cubic ft. | 10.1 |
| Flexural Strength, (transverse modulus) lb. per sq. in. | 108 |
| Flexural Strength, after 24 hr. exposure to high humidity | 45 |
| Water Absorption, after 3 hr. boiling water immersion, percent | 40 |

Thermal conductivity measurements of the product of the above typical example gave the following values, in B.t.u. per hour, per square foot, per degree F., per inch thickness:

| | |
|---|---|
| At mean temperature 50° F. | 0.29 |
| At mean temperature 150° F. | 0.38 |
| At mean temperature 300° F. | 0.46 |

It is thus apparent that this new insulation product has very low density, high thermal insulation efficiency, high strength, retention of substantial strength under high humidity exposure, relatively low water absorption, and does not disintegrate structurally when subjected to boiling water immersion.

Comparing the properties of the insulation product of the above example of the present invention with those of the product disclosed in U.S. Patent No. 2,884,380, it is evident that it has greatly improved properties. Specifically, the perlite insulation of the present invention is about 20 percent lighter in density than the product of Cook; it is about 11 percent stronger as measured by the flexural strength test, and is more resistant to abrasion. Most importantly, it is about 15 percent more efficient as a thermal insulation. The Cook product had a thermal conductivity of 0.34 B.t.u. per hour per square foot per inch thickness at a mean temperature of 100° F., whereas the present product has a thermal conductivity of only 0.29 B.t.u. Also, the product of the present invention can be made at a substantially lower cost, in the range of 10% to 20% less.

Preferably the new molded thermal insulation is produced at a density in the range of about 9 to 11 pounds per cubic foot. At lower densities the molded product has less strength and tends to be more fragile and less resistant to mechanical damage. While the present compositions can readily be molded at higher densities, this results in higher conductivity and the product is therefore less efficient as a thermal insulation.

Referring to the composition of the above typical example of the new thermal insulation, some variation in the proportions of each of the components is permissible. For optimum properties of the finished product and greatest ease of manufacture, it is preferred to use compositions within the following ranges:

|  | Preferred Composition Range, Dry Weight Percent | |
|---|---|---|
|  | Min. | Max. |
| Expanded Perlite | 60 | 75 |
| Bentonite Clay | 8 | 12 |
| Modified Starch, low- and Stable viscosity | 5 | 8 |
| Asbestos Fiber, 7 Grade | 15 | 25 |
| Long Glass Fiber, Chopped Spun Roving | 0.3 | 2 |
| Phenolic Resin, Thermosetting | 1.5 | 2.5 |
| Silicone, Water Soluble | 0.3 | 0.6 |

We have found that some, though not all, of the advantages of the invention are afforded by compositions within a somewhat broader range, as follows:

|  | Broad Composition Range, Dry Weight Percent | |
|---|---|---|
|  | Min. | Max. |
| Expanded Perlite | 40 | 80 |
| Bentonite Clay | 5 | 20 |
| Modified Starch, low- and stable-viscosity | 4 | 10 |
| Asbestos Fiber, 7 Grade | 5 | 25 |
| Long Glass Fiber, Chopped Spun Roving | 0.2 | 3 |
| Phenolic Resin, Thermosetting | 1 | 4 |
| Silicone, Water Soluble | 0.2 | 1 |

Compositions with less than 50% of expanded perlite tend to produce thermal insulation of higher density and lower insulation efficiency. With high percentages of expanded perlite, the insulation product becomes weaker and more fragile. If insufficient of the long glass fiber is included in the composition, the mechanical reinforcement may be inadequate to prevent cracked pieces from breaking apart. Insufficient phenolic resin will reduce the strength, hardness and water resistance of the finished molded product.

In the composition of the typical example of the product of this invention, the water-soluble silicone used to impart water-repellency to the molded thermal insulation was sodium methyl siliconate, the monosodium salt of methyl siliconic acid. When a water-dispersed film of sodium methyl siliconate is dried in air it reacts with carbon dioxide and forms a completely insoluble silicone polymer which is highly water repellent. Potassium methyl siliconate reacts similarly and also may be used but costs more than the sodium salt. Sodium methyl siliconate has been on the market for over ten years and is produced and sold under this name by several large chemical manufacturers of organo-silicon compounds. Other water-soluble silicone products that are commercially available for use as water-repellent treatment of mineral surfaces are sodium vinyl siliconate and amyl trimethoxysilane (the latter is hydrolyzed and rendered soluble by addition of a small amount of acetic acid).

The term "silicone" is used broadly in the chemical industry to cover a wide variety of organo-silicon compounds and polymers. For the purposes of this invention, one is concerned only with those compounds which are water soluble, such as the alkali metal methyl siliconates and sodium vinyl siliconate, and which, upon drying, produce a water-repellent film on the mineral surface to which the silicone solution has been applied. Any such water-soluble silicone compound will serve this purpose.

From the foregoing discussion it is to be understood that the phrase "water-soluble silicone compound," as used in the claims, means organo-silicon compounds and polymers as outlined above.

The short asbestos fiber in the composition serves a special purpose. The inclusion of a substantial proportion of very short asbestos improves the thermal insulation efficiency, that is, it reduces the thermal conductivity, of the molded insulation. Apparently this effect results from the fibers filling the voids between the cellular perlite particles with a fine fibrous mass which, in effect, subdivides the larger voids into extremely minute voids. The short asbestos fiber also toughens the molded insulation and makes it more resistant to breaking or cracking under stress.

For this purpose any finely-divided "short" asbestos fiber may be used. The preferred fiber is Canadian Chrysotile asbestos; and any grade in the 7 group, of the Canadian (Quebec Asbestos Manufacturers' Association) asbestos fiber classification is suitable. Generally, the shortest grades, 7T or 7W, will be used because of their lower cost and easy workability in the perlite insulation mixture.

As to the glass fibers included for mechanical reinforcement of the new molded insulation, there is used what is termed chopped spun glass roving, composed of bonded multiple strands of individual glass fibers, cut to desired length. Fibers in the range of ¼ inch to about 1¼ inch length can be used, but the 1 inch length is most effective for the purpose.

The invention having now been described in detail, and the ranges within which a wide variety of improved products may be made having also been set forth, the only limitations intended are defined in the following claims.

The embodiments of the invention in which an exclusive property or privilege is claimed are defined as follows:

1. A molded thermal insulating material consisting of from about 40% to about 80% by weight of cellular expanded perlite having a bulk density in the range of about 1.8 to about 3.5 lb./cu. ft., from about 5% to about 20% of montmorillonitic clay as a mineral binder, from about 4% to about 10% of a water-dispersible low- and stable-viscosity modified starch as a flexible, film-forming organic binder, from about 1% to about 4% of a phenol-formaldehyde thermosetting resin as a thermo-hardening organic binder, from about 5% to about 25% of 7 Grade short asbestos fiber, and from about 0.2% to about 3% of long glass fibers as mechanical reinforcement for said molded insulation, said composition being bonded by said binders into a monolithic mass, said thermal insulating material showing no significant change from mold dimensions, having low density, high flexural strength, high resistance to crushing, high thermal insulation efficiency in the temperature range from about —50° F. to about 800° F., low absorptivity for atmospheric moisture, and being highly resistant to structural deterioration by boiling water.

2. A molded thermal insulating material according to claim 1, including from about 0.2% to about 1% of a water-soluble silicone compound as a water repellent.

3. A molded thermal insulating material according to claim 2, wherein said long glass fibers are one-inch spun glass roving.

4. A molded thermal insulating material consisting of from about 60% to about 75% by weight of cellular expanded perlite having a bulk density in the range of about 2.3 to about 2.8 pounds per cubic foot, from about 8% to about 12% of bentonite clay as a mineral binder, from about 5% to about 8% of a water-dispersible low- and stable-viscosity modified starch as a flexible, film-forming organic binder, from about 1.5% to about 2.5% of a phenolformaldehyde thermosetting resin as a thermo-hardening organic binder, from about 15% to about 25% of 7 Grade short asbestos fiber, and from about 0.3% to about 2% of long glass fibers as mechanical reinforcement for said molded insulation, said composition being bonded by said binders into a monolithic mass, said thermal insulating material showing no significant change from mold dimensions, having low density, high flexural strength, high resistance to crushing, high thermal insulation efficiency in the temperature range from about —50° F. to about 800° F., low absorptivity for atmospheric moisture, and being highly resistant to structural deterioration by boiling water.

5. A molded thermal insulating material according to claim 4, including from about 0.3% to about 0.6% of a water soluble silicone compound as a water repellent.

6. A molded thermal insulating material according to claim 4, wherein said long glass fibers are one-inch spun glass roving.

7. A molded thermal insulating material according to claim 6, including from about 0.3% to about 0.6% of a water soluble silicone compound as a water repellent.

8. A molded thermal insulating material consisting of about 63.1% by weight of cellular expanded perlite having a bulk density in the range of about 2.3 to about 2.8 pounds per cubic foot, about 8.65% of montmorillonitic clay, about 6.32% of water-dispersible low- and stable-viscosity modified starch, about 18.9% of 7W Grade short asbestos fiber, about 0.75% of long glass fibers, and about 1.89% of a phenol-formaldehyde thermosetting resin, said composition being bonded into a monolithic mass, said thermal insulating material showing no significant change from mold dimensions, having a density in the range of about 9 to 11 pounds per cubic foot, high thermal insulation efficiency in the temperature range from about 0° F. to about 350° F., high flexural strength, high resistance to crushing, low absorptivity for atmospheric moisture, and being highly resistant to structural deterioration by boiling water.

9. A molded thermal insulating material according to claim 8, including about 0.39% of a water soluble silicone compound as a water repellent.

10. A molded thermal insulating material according to claim 9, wherein said long glass fibers are one-inch spun glass roving.

11. A binder composition for a pressure-molded monolithic mass of finely-divided cellular and fibrous siliceous mineral and inorganic thermal insulating materials, consisting of a mutually compatible colloidal solution in water of a high-swelling bentonite clay, a water-dispersible low- and stable-viscosity modified starch and a phenol-formaldehyde thermosetting resin, said bentonite clay being in the range of from about 25% to about 80% of the total dry binder solids, said starch being in the range of from about 15% to about 55% of the total dry binder solids, and said phenol-formaldehyde resin being in the range of from about 5% to about 20% of the total dry binder solids, by weight, said binder solution being of free flowing consistency and readily sprayable for application to said thermal insulating materials, having stable viscosity, and being resistant to migration of the phenol-formaldehyde resin to the surface of the molded mass during drying for removal of the excess water.

12. A binder composition according to claim 11, wherein said bentonite clay constitutes a major proportion of the total dry binder solids in the range from about 50% to about 65% by weight, said starch constitutes a minor proportion of the total dry binder solids in the range of from about 25% to about 40% by weight, and said phenol-formaldehyde resin constitutes a lesser proportion than said starch in the range of from about 8% to about 15% of the total dry binder solids by weight.

13. A binder composition according to claim 11, wherein said bentonite clay constitutes about 51%, the starch about 37.7% and the phenol-formaldehyde resin about 11.3% by weight of binder solids, said binder solids being in a colloidal solution in water of about 11.1% by weight of said binder solids.

14. A binder composition consisting of a mutually compatible colloidal solution in water of a high-swelling bentonite clay, a water-dispersible low- and stable-viscosity modified starch and a phenol-formaldehyde thermosetting resin, said bentonite clay being in the range of from about 25% to about 80% of the total dry binder solids, said starch being in the range of from about 15% to about 55% of the total dry binder solids, and said phenol-formaldehyde resin being in the range of from about 5% to about 20% of the total dry binder solids, by weight, said binder solution being of free-flowing consistency and readily sprayable, and having stable viscosity.

15. A binder composition according to claim 14, wherein said bentonite clay constitutes a major proportion of the total dry binder solids in the range from about 50% to about 65% by weight, said starch constitutes a minor proportion of the total dry bider solids in the range of from about 25% to about 40% by weight, and said phenol-formaldehyde resin constitutes a lesser proportion than said starch in the range of from about 8% to about 15% of the total dry binder solids by weight.

16. A binder composition according to claim 14, wherein said bentonite clay constitutes about 51%, the starch about 37.7% and the phenol-formaldehyde resin about 11.3% by weight of binder solids, said binder solids being in a colloidal solution in water of about 11.1% by weight of said binder solids.

References Cited
UNITED STATES PATENTS

| | | | |
|---|---|---|---|
| 2,340,338 | 2/1944 | Murray | 260—233.5 |
| 2,510,748 | 6/1950 | Lolkema et al. | 260—9 |
| 2,619,475 | 11/1952 | Kovreg | 260—233.5 |
| 2,884,380 | 4/1959 | Cook et al. | 252—62 |

WILLIAM H. SHORT, *Primary Examiner.*

E. M. WOODBERRY, *Assistant Examiner.*